(12) United States Patent
Liu et al.

(10) Patent No.: US 12,471,093 B1
(45) Date of Patent: Nov. 11, 2025

(54) NEURAL NETWORK-ASSISTED GENERATION OF INTERLEAVER IN WIRELESS COMMUNICATION SYSTEM

(71) Applicant: Nokia Solutions and Networks Oy, Espoo (FI)

(72) Inventors: Bryan Liu, Massy (FR); Samad Ali, Oulu (FI); Oana-Elena Barbu, Aalborg (DK); Amir Aghaei Anvigh, Nozay (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/008,299

(22) Filed: Jan. 2, 2025

(30) Foreign Application Priority Data

Jan. 3, 2024 (EP) ................................. 24150133

(51) Int. Cl.
  H04W 72/20 (2023.01)
  H04B 7/06 (2006.01)
  H04L 1/00 (2006.01)
  H04L 41/16 (2022.01)
  H04W 76/20 (2018.01)

(52) U.S. Cl.
  CPC .......... H04W 72/20 (2023.01); H04B 7/0626 (2013.01); H04L 1/0059 (2013.01); H04L 1/0071 (2013.01); H04L 41/16 (2013.01); H04W 76/20 (2018.02)

(58) Field of Classification Search
  CPC ........ H04B 7/0626; H04L 1/0059–006; H04L 1/0071; H04L 41/16; H04W 72/20; H04W 72/23–232; H04W 76/20–28
  See application file for complete search history.

(56) References Cited

U.S. PATENT DOCUMENTS

| | | | |
|---|---|---|---|
| 2019/0044544 A1* | 2/2019 | Liao | H04L 1/0057 |
| 2021/0044383 A1* | 2/2021 | Sarkis | H04W 72/23 |
| 2022/0103290 A1* | 3/2022 | Yang | H04L 5/14 |

(Continued)

OTHER PUBLICATIONS

Shin et al., "Mapping Selection and Code Construction for 2m-ary Polar-Coded Modulation", IEEE Communications Letters, vol. 16, No. 6, Jun. 2012, pp. 905-908.

(Continued)

*Primary Examiner* — Thomas R Cairns
(74) *Attorney, Agent, or Firm* — Nokia Solutions and Networks Oy (57) ABSTRACT

The present disclosure relates to a technical solution that improves the reliability of communications over a wireless communication channel by replacing a conventional interleaver (e.g., random interleaver) with a Neural Network (NN)-generated interleaver. For this purpose, a well-trained NN is used, which is configured to receive a UE connection status and a channel status as input data and outputs the interleaver in the form of an orthogonal binary matrix. The NN is shared by a UE and a network node. The network node may use the interleaver to interleave a set of bits in a downlink control message before the downlink control message is encoded, e.g., with an error correcting code, such as a polar code. The UE may generate and transpose the interleaver to obtain a deinterleaver to be applied to the downlink control message after its decoding (e.g., polar decoding).

12 Claims, 10 Drawing Sheets

(56) References Cited

U.S. PATENT DOCUMENTS

| | | | |
|---|---|---|---|
| 2022/0158760 A1* | 5/2022 | Hwang | H04L 1/007 |
| 2023/0239881 A1* | 7/2023 | Yerramalli | H04W 28/06 370/329 |
| 2023/0359886 A1* | 11/2023 | Vitthaladevuni | H04L 41/16 |
| 2024/0146454 A1* | 5/2024 | Davydov | H04L 1/0041 |

OTHER PUBLICATIONS

O'Shea et al., "An Introduction to Machine Learning Communications Systems", arXiv, Feb. 2, 2017, pp. 1-10.

Snasel et al., "Genetic Algorithms for Turbo Code Interleaver Optimization", Seventh International Conference on Intelligent Systems Design and Applications (ISDA 2007), Oct. 20-24, 2007, pp. 277-282.

Chahine et al., "Turbo Autoencoder with a Trainable Interleaver", IEEE International Conference on Communications, May 16-20, 2022, pp. 3886-3891.

Lyu et al., "AutoShuffleNet: Learning Permutation Matrices via an Exact Lipschitz Continuous Penalty in Deep Convolutional Neural Networks", Proceedings of the 26th ACM SIGKDD International Conference on Knowledge Discovery & Data Mining, Aug. 20, 2020, pp. 608-616.

Mena et al., "Learning Latent Permutations with Gumbel-Sinkhorn Networks", arXiv, Feb. 23, 2018, pp. 1-22.

Honkala et al., "DeepRx: Fully Convolutional Deep Learning Receiver", IEEE Transactions on Wireless Communications, vol. 20, No. 6, Jun. 2021, pp. 3925-3940.

Larue et al., "Neural Belief Propagation Auto-Encoder for Linear Block Code Design", IEEE Transactions on Communications, vol. 70, No. 11, Nov. 2022, pp. 7250-7264.

Hoydis et al., "Sionna: An Open-Source Library for Next-Generation Physical Layer Research", arXiv, Mar. 22, 2022, pp. 1-5.

"IEEE 802.11", Wikipedia, Retrieved on Dec. 30, 2024, Webpage available at : https://en.wikipedia.org/wiki/IEEE_802.11.

Extended European Search Report received for corresponding European Patent Application No. 24150133.7, dated May 23, 2024, 4 pages.

Kim et al., "Physical Layer Communication via Deep Learning", IEEE Journal on Selected Areas in Information Theory, vol. 1, No. 1, May 2020, pp. 5-18.

Zhu et al., "Learning to Denoise and Decode: A Novel Residual Neural Network Decoder for Polar Codes", IEEE Transactions on Vehicular Technology, vol. 69, No. 8, Aug. 2020, pp. 8725-8738.

\* cited by examiner

NEURAL NETWORK-ASSISTED GENERATION OF INTERLEAVER IN WIRELESS COMMUNICATION SYSTEM

RELATED APPLICATION

This application claims benefit of priority from European Patent App. No. 24150133.7, filed Jan. 3, 2024, the disclosure of which is hereby incorporated in its entirety by reference herein.

TECHNICAL FIELD

The present disclosure relates generally to the field of wireless communications. In particular, the present disclosure relates to a technique for leveraging a deep learning algorithm (e.g., Neural Network (NN)) to adaptively generate an interleaver to be applied to messages transmitted from a network node (e.g., gNB) to a User Equipment (UE), or vice versa, in a wireless communication network.

BACKGROUND

Reliability has been extensively discussed with the evolution of the cellular technology. With the growing demand of various functionalities in scenarios, such as industrial internets, smart grid and remote surgery, a robust control channel becomes important for next-generation networks, such as 6G networks.

A polar code has been standardized as a channel code for control channels in latency-sensitive services, such as enhanced Mobile Broadband (eMBB) and Ultra Reliable Low Latency Communications (URLLC) services. In a 5G New Radio (NR) network, once a control message is generated, Cyclic Redundancy Check (CRC) bits are attached, and the concatenated sequence is interleaved and passed into a polar encoder. The order of permutation for an interleaver is determined by the length of the control message. Depending on a channel condition, a pattern for generating the control message and the decoding algorithm that is implemented at the receiver side, there is an optimal permutation to map the generated control bits of the control message into the bit positions of the polar encoder to minimize a Block Error Rate (BLER) at the receiver side.

In the conventional control message design, the interleaver is configured to permutate control bits to combat any burst errors that might be introduced by the imperfection of a control channel. However, the interleaver is designed according to a coded bit length and the interleaver assumes that the source entropy of a control bit is constant and all the control bits have an identical entropy (i.e., for a control message with a length of N, the source entropy of control bit $b_i$ has $H(b_i)=1$ for $i \in \{1, 2, \ldots, N\}$). The assumption does not hold when a UE operates following a certain pattern and the generated control bits are not equal-probable. For instance, the UE might have a low traffic, or an uplink or downlink channel is robust and stable. As a result, the source entropies of the control bits for frequency domain resource assignment and power control commands are less than 1. This variety provides a room to further improve the design of the interleaver so that the decoding performance of the control message is improved, and an ultra-reliable control channel can be achieved.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that enables NN-assisted generation of an interleaver in a wireless communication network.

The objective above is achieved by the features of the independent claims in the appended claims. Further embodiments and examples are apparent from the dependent claims, the detailed description, and the accompanying drawings.

According to a first aspect, a network node in a wireless communication network is provided. The network node comprises at least one processor and at least one memory storing instructions that, when executed by the at least one processor, cause the network node to perform at least as follows. At first, the network node generates a control message to be transmitted to a UE over a wireless communication channel. The message comprises a set of bits. The wireless communication channel has a channel status, and the UE has a connection status in the wireless communication network. Then, the network node generates an interleaver by using a NN. The NN is pre-known to both the network node and the UE. The NN is configured to receive the channel status of the wireless communication channel and the connection status of the UE as input data and output the interleaver in the form of an orthogonal binary matrix. Further, the network node interleaves the set of bits in the control message by using the generated interleaver, encodes the control message comprising the interleaved set of bits, and transmits the encoded control message to the UE over the wireless communication channel. By using the interleaver thus generated, it is possible to cope with the problem of burst errors which may be introduced by the wireless communication channel. Thus, the reliability of communications over the wireless communication channel may be improved. Furthermore, the interleaver generated by the NN may be used as part of any deep learning-based transmitter and receiver designs. Additionally, the interleaver thus generated may be applied for Downlink Control Information (DCI) messages with different code rates.

In one example embodiment of the first aspect, the network node is configured to encode the control message based on a polar code or a convolutional code. Polar and convolutional codes may allow one to provide reliable information transfer over bandwidth- or latency-constrained communication channels even in the presence of data-corrupting noise. The joint use of the polar or convolutional encoding and the interleaver generated by the NN may further improve the reliability of communications over the wireless communication channel.

In one example embodiment of the first aspect, the connection status of the UE is defined by a Radio Resource Control (RRC) protocol, and the channel status of the wireless communication channel comprises Channel State Information (CSI) previously reported by the UE to the network node. By using the CSI and the RRC states, the NN may properly generate the interleaver.

In one example embodiment of the first aspect, the NN is pre-trained by using an end-to-end learning model with a back-propagation algorithm and a cross-entropy loss function. The end-to-end learning model may allow the NN to find the optimal/sub-optimal interleaver for further use in the wireless communication channel.

In one example embodiment of the first aspect, the NN is configured as a Gumbel-Sinkhorn network. By using this NN type, it is possible to generate the interleaver more efficiently based on the channel status of the wireless communication channel and the connection status of the UE.

According to a second aspect, a UE in a wireless communication network is provided. The UE comprises at least one processor and at least one memory storing instructions that, when executed by the at least one processor, cause the UE to perform at least as follows. At first, the UE receives an encoded control message from a network node over a wireless communication channel. The encoded message comprises an interleaved set of bits. The wireless communication channel has a channel status. After that, the UE decodes the encoded control message to retrieve the interleaved set of bits. Further, the UE generates an interleaver by using a NN. The NN is pre-known to both the UE and the network node. The NN is configured to receive the channel status of the wireless communication channel and a connection status of the UE in the wireless communication network as input data and output the interleaver in the form of an orthogonal binary matrix. Subsequently, the UE generates a deinterleaver by applying a transpose operation to the generated interleaver, and deinterleaves the interleaved set of bits by using the generated deinterleaver. Since the NN is shared by the UE and the network node, the UE just needs to transpose the NN output to find the proper deinterleaver. By doing so, it is possible to cope with the problem of burst errors which may be introduced by the wireless communication channel. Thus, the reliability of communications over the wireless communication channel may be improved. Similarly, the deinterleaver obtained by applying the transpose operation to the interleaver may be used as part of any deep learning-based transmitter and receiver designs.

In one example embodiment of the second aspect, the encoded control message is obtained based on a polar or convolutional code, and the UE is configured to decode the encoded message based on polar code or convolutional code, respectively. Polar and convolutional codes may allow one to provide reliable information transfer over bandwidth- or latency-constrained communication channels even in the presence of data-corrupting noise. The joint use of the polar or convolutional decoding and the deinterleaver may further improve the reliability of communications over the wireless communication channel.

In one example embodiment of the second aspect, the connection status of the UE is defined by a RRC protocol, and the channel status of the wireless communication channel comprises CSI previous reported by the UE to the network node. By using the CSI and the RRC states, the NN may properly generate the interleaver.

In one example embodiment of the second aspect, the NN is pre-trained by using an end-to-end learning model with a back-propagation algorithm and a cross-entropy loss function. The end-to-end learning model may allow the NN to find the optimal/sub-optimal interleaver and, subsequently, obtain the optimal/sub-optimal deinterleaver.

In one example embodiment of the second aspect, the NN is configured as a Gumbel-Sinkhorn network. By using this NN type, it is possible to generate the interleaver more efficiently based on the channel status of the wireless communication channel and the connection status of the UE.

According to a third aspect, a method for operating a network node in a wireless communication network is provided. The method starts with the step of generating a control message to be transmitted to a UE over a wireless communication channel. The control message comprises a set of bits. The wireless communication channel has a channel status, and the UE has a connection status in the wireless communication network. Then, the method proceeds to the step of generating an interleaver by using a NN. The NN is pre-known to both the network node and the UE, and the NN is configured to receive the channel status of the wireless communication channel and the connection status of the UE as input data and output the interleaver in the form of an orthogonal binary matrix. Further, the method goes on to the steps of interleaving the set of bits in the control message by using the generated interleaver, encoding the control message comprising the interleaved set of bits, and transmitting the encoded control message to the UE over the wireless communication channel. By using the interleaver thus generated, it is possible to cope with the problem of burst errors which may be introduced by the wireless communication channel. Thus, the reliability of communications over the wireless communication channel may be improved. Furthermore, the interleaver generated by the NN may be used as part of any deep learning-based transmitter and receiver designs. Additionally, the interleaver thus generated may be applied for DCI messages with different code rates.

According to a fourth aspect, a method for operating a UE in a wireless communication network is provided. The method starts with the step of receiving an encoded control message from a network node over a wireless communication channel. The encoded control message comprises an interleaved set of bits. The wireless communication channel has a channel status. Further, the method proceeds to the step of decoding the encoded control message to retrieve the interleaved set of bits. After that, the method goes on to the step of generating an interleaver by using a NN. The NN is pre-known to both the UE and the network node, and the NN is configured to receive the channel status of the wireless communication channel and a connection status of the UE in the wireless communication network as input data and output the interleaver in the form of an orthogonal binary matrix. Subsequently, the method proceeds to the steps of generating a deinterleaver by applying a transpose operation to the generated interleaver and deinterleaving the interleaved set of bits by using the generated deinterleaver. Since the NN is shared by the UE and the network node, the UE just needs to transpose the NN output to find the proper deinterleaver. By doing so, it is possible to cope with the problem of burst errors which may be introduced by the wireless communication channel. Thus, the reliability of communications over the wireless communication channel may be improved. Similarly, the deinterleaver obtained by applying the transpose operation to the interleaver may be used as part of any deep learning-based transmitter and receiver designs.

According to a fifth aspect, a computer program product is provided. The computer program product comprises a computer-readable storage medium that stores a computer code. Being executed by at least one processor, the computer code causes the at least one processor to perform the method according to the third aspect. By using such a computer program product, it is possible to simplify the implementation of the method according to the third aspect in any network node, like the network node according to the first aspect.

According to a sixth aspect, a computer program product is provided. The computer program product comprises a computer-readable storage medium that stores a computer code. Being executed by at least one processor, the computer code causes the at least one processor to perform the method according to the fourth aspect. By using such a computer program product, it is possible to simplify the implementation of the method according to the fourth aspect in any UE, like the UE according to the second aspect.

According to a seventh aspect, a network node in a wireless communication network is provided. The network node comprises a means for generating a control message to be transmitted to a UE over a wireless communication channel. The control message comprises a set of bits. The wireless communication channel has a channel status, and the UE has a connection status in the wireless communication network. The network node further comprises a means for generating an interleaver by using a NN. The NN is pre-known to both the network node and the UE. The NN is configured to receive the channel status of the wireless communication channel and the connection status of the UE as input data and output the interleaver in the form of an orthogonal binary matrix. The network node further comprises a means for interleaving the set of bits in the control message by using the generated interleaver, a means for encoding the control message comprising the interleaved set of bits, and a means for transmitting the encoded control message to the UE over the wireless communication channel. By using the interleaver thus generated, it is possible to cope with the problem of burst errors which may be introduced by the wireless communication channel. Thus, the reliability of communications over the wireless communication channel may be improved. Furthermore, the interleaver generated by the NN may be used as part of any deep learning-based transmitter and receiver designs. Additionally, the interleaver thus generated may be applied for DCI messages with different code rates.

According to an eighth aspect, a UE in a wireless communication network is provided. The UE comprises a means for receiving an encoded control message from a network node over a wireless communication channel. The encoded control message comprises an interleaved set of bits. The wireless communication channel has a channel status. The UE further comprises a means for decoding the encoded control message to retrieve the interleaved set of bits and a means for generating an interleaver by using a NN. The NN is pre-known to both the UE and the network node. The NN is configured to receive the channel status of the wireless communication channel and a connection status of the UE in the wireless communication network as input data and output the interleaver in the form of an orthogonal binary matrix. The UE further comprises a means for generating a deinterleaver by applying a transpose operation to the generated interleaver and a means for deinterleaving the interleaved set of bits by using the generated deinterleaver. Since the NN is shared by the UE and the network node, the UE just needs to transpose the NN output to find the proper deinterleaver. By doing so, it is possible to cope with the problem of burst errors which may be introduced by the wireless communication channel. Thus, the reliability of communications over the wireless communication channel may be improved. Similarly, the deinterleaver obtained by applying the transpose operation to the interleaver may be used as part of any deep learning-based transmitter and receiver designs.

Other features and advantages of the present disclosure will be apparent upon reading the following detailed description and reviewing the accompanying drawings.

BRIEF DESCRIPTION OF THE DRAWINGS

The present disclosure is explained below with reference to the accompanying drawings in which.

DETAILED DESCRIPTION

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatuses and methods disclosed herein can be implemented in practice by using any numbers of the embodiments provided herein. Furthermore, it should be understood that any embodiment of the present disclosure can be implemented using one or more of the elements presented in the appended claims.

Unless otherwise stated, any embodiment recited herein as "example embodiment" should not be construed as preferable or having an advantage over other embodiments.

According to the example embodiments disclosed herein, a User Equipment (UE) may refer to an electronic computing device that is configured to perform wireless communications. The UE may be implemented as a mobile station, a mobile terminal, a mobile subscriber unit, a mobile phone, a cellular phone, a smart phone, a cordless phone, a personal digital assistant (PDA), a wireless communication device, a desktop computer, a laptop computer, a tablet computer, a gaming device, a netbook, a smartbook, an ultrabook, a medical mobile device or equipment, a biometric sensor, a wearable device (e.g., a smart watch, smart glasses, a smart wrist band, etc.), an entertainment device (e.g., an audio player, a video player, etc.), a vehicular component or sensor (e.g., a driver-assistance system), a smart meter/sensor, an unmanned vehicle (e.g., an industrial robot, a quadcopter, etc.) and its component (e.g., a self-driving car computer), industrial manufacturing equipment, a global positioning system (GPS) device, an Internet-of-Things (IoT) device, an Industrial IoT (IIoT) device, a machine-type communication (MTC) device, a group of Massive IoT (MIoT) or Massive MTC (mMTC) devices/sensors, or any other suitable mobile device configured to support wireless communications. In some embodiments, the UE may refer to at least two collocated and inter-connected UEs thus defined.

As used in the example embodiments disclosed herein, a network node may refer to a fixed point of communication or communication node for a UE in a particular wireless communication network. More specifically, the network node may be used to connect the UE to a Data Network (DN) through a Core Network (CN) and may be referred to as a base transceiver station (BTS) in terms of the 2G communication technology, a NodeB in terms of the 3G communication technology, an evolved NodeB (eNodeB or eNB) in terms of the 4G communication technology, and a gNB in terms of the 5G New Radio (NR) communication technology. The network node may serve different cells, such as a macrocell, a microcell, a picocell, a femtocell, and/or other types of cells. The macrocell may cover a relatively large geographic area (e.g., at least several kilometers in radius). The microcell may cover a geographic area less than two kilometers in radius, for example. The picocell may cover a relatively small geographic area, such, for example, as offices, shopping malls, train stations, stock exchanges, etc. The femtocell may cover an even smaller geographic area (e.g., a home). Correspondingly, the network node serving the macrocell may be referred to as a macro node, the network node serving the microcell may be referred to as a micro node, and so on.

According to the example embodiments disclosed herein, a wireless communication network, in which a UE and a network node communicate with each other, may refer to a cellular or mobile network, a Wireless Local Area Network (WLAN), a Wireless Personal Area Networks (WPAN), a Wireless Wide Area Network (WWAN), a satellite communication (SATCOM) system, or any other type of wireless communication networks. Each of these types of wireless communication networks supports wireless communications according to one or more communication protocol standards. For example, the cellular network may operate according to the Global System for Mobile Communications (GSM) standard, the Code-Division Multiple Access (CDMA) standard, the Wide-Band Code-Division Multiple Access (WCDM) standard, the Time-Division Multiple Access (TDMA) standard, or any other communication protocol standard, the WLAN may operate according to one or more versions of the IEEE 802.11 standards, the WPAN may operate according to the Infrared Data Association (IrDA), Wireless USB, Bluetooth, or ZigBee standard, and the WWAN may operate according to the Worldwide Interoperability for Microwave Access (WiMAX) standard.

Error correcting codes (e.g., polar codes) can correct errors successfully if there are not too many errors in a single codeword. However, errors sometimes tend to be "bursty" in the sense that there can be a local concentration of many errors. This situation can occur, for example, in burst error channels, such as wireless communication channels. To cope with the problem of burst errors, interleaving can be used, which consists in dispersing sequences of bits in a bitstream so as to minimize the effect of burst errors introduced in transmission. There are different kinds of interleavers currently used in different communication systems, but none of them considers the diversity of entropies of source control bits.

To demonstrate that the diversity of the entropies of the source control bits affects polar decoding performance, let us consider the following example. Suppose an encoded codeword length is 128 and there are 60 information bits, and each information bit is sampled from a Bernoulli distribution of $b_i \sim \text{Bern}(\rho_i)$, where $\rho_i$ is an activation ratio that is randomly drawn from a uniform distribution from 0 to 1. As a result, each control bit has its own entropy. Moreover, since a polar code bit-wise capacity is different, it becomes important to map a control bit with a small entropy value to a polar code bit position which has a low bit-wise capacity, and vice versa. Therefore, the selection of a suitable interleaver is of great importance.

Figure 1:
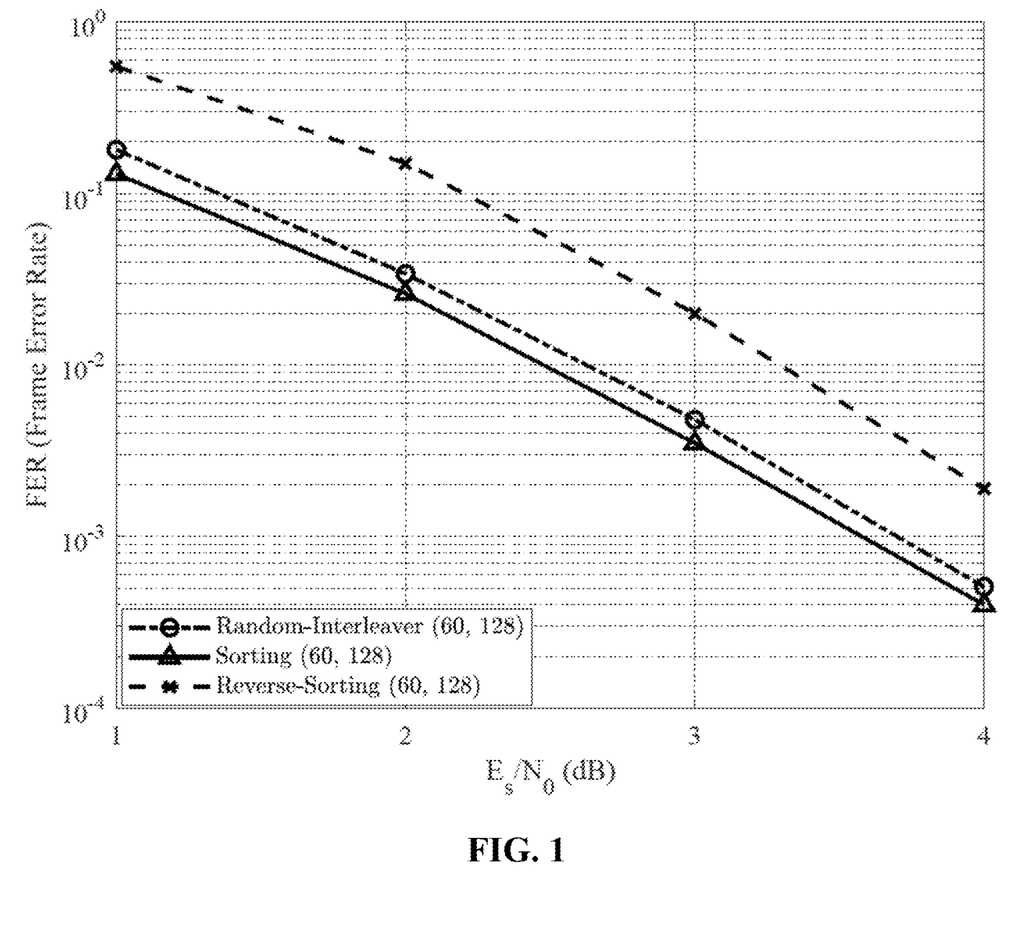
FIG. 1 shows a Frame Error Rate (FER) versus a Signal-to-Noise Ratio (SNR) for three different interleaving strategies, namely: "random interleaver" (i.e., the interleaver is randomly generated), "sorting interleaver" (i.e., the interleaver sorts the entropy of each bit and maps the bit with the highest entropy to the polar code bit position with the highest bit-wise capacity), and "reverse-sorting interleaver" (i.e., the interleaver maps the bit with the highest entropy to the polar code bit position with the lowest bit-wise capacity)

FIG. 1 shows a Frame Error Rate (FER) versus a Signal-to-Noise Ratio (SNR) for three different interleaving strategies. The SNR is expressed here as $E_s/N_0$, where $E_s$ is the energy per symbol and $N_0$ is the single-sided noise power spectral density. The three strategies are conditionally called as follows: "random interleaver", "sorting (interleaver)", and "reverse-sorting (interleaver)". "Random-Interleaver" refers to the interleaver that is randomly generated, where information bits are randomly mapped to information bits of a polar code. "Sorting (interleaver)" indicates the interleaver that sorts the entropy of each control bit and maps the control bit with the highest entropy to the polar code bit position with the highest bit-wise capacity. "Reverse-Sorting (interleaver)" refers to the interleaver that maps the control bit with the highest entropy to the polar code information bit position with the lowest bit-wise capacity. In each of the three interleaving strategies, the codeword length is equal to 128, and the number of information bits is 60. Moreover, a Quadrature Phase Shift Keying (QPSK) modulation is used, and it is assumed that the transmitted symbols are corrupted by an additive white Gaussian noise (AWGN) channel. It can be seen that "Reverse-Sorting (interleaver)" provides the worst polar decoding performance as the control bit with the highest entropy is not well-protected. On the other hand, "Sorting (interleaver)" outperforms "Random-interleaver" and gives the best polar decoding performance, since the control bits are protected based on their entropy values.

The numerical results presented in FIG. 1 show that an interleaver can influence the decoding performance and note that with the possible detrimental effect of a time-varying channel and the diversity of source entropies of control bits, the performance gain will be more significant, which highlights the importance of the selection of a suitable interleaver.

The example embodiments disclosed herein provide a technical solution that improves the reliability of communications over a wireless communication channel by replacing a conventional interleaver (e.g., random interleaver) with an adaptive NN-generated interleaver. For this purpose, a well-trained NN is used, which is configured to receive a UE connection status (e.g., defined by the RRC protocol) and a channel status (e.g., one or more different CQIs reported by the UE) as input data and outputs the interleaver in the form of an orthogonal binary matrix. The NN is shared by a UE and a network node. The network node may use the interleaver to interleave a set of bits in a downlink control message before the downlink control message is encoded, e.g., with an error correcting code, such as a polar code. The UE may transpose the interleaver to obtain a deinterleaver to be applied to the downlink control message after its decoding (e.g., polar decoding).

Figure 2:
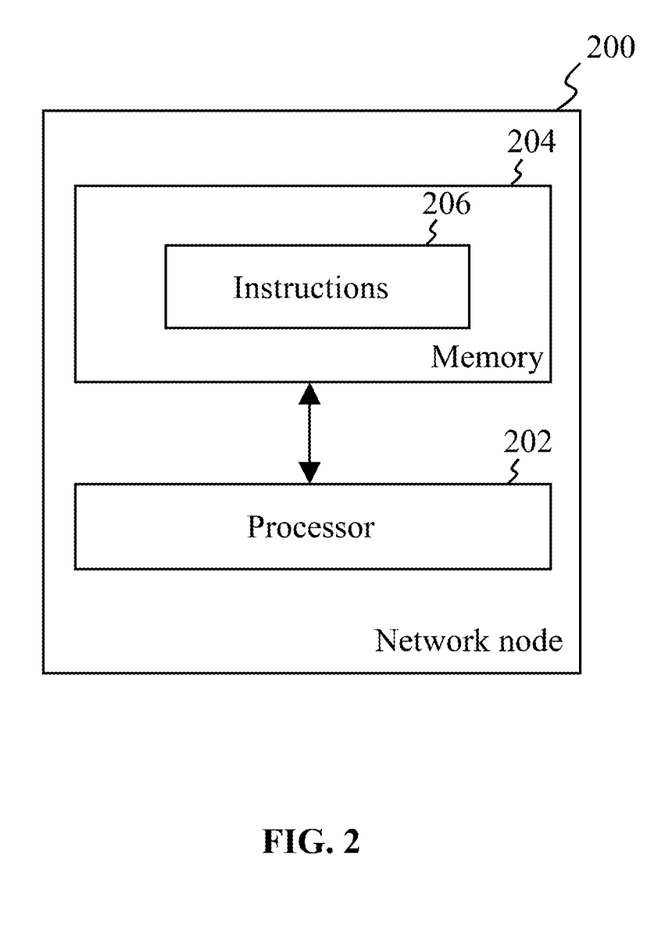
FIG. 2 shows a block diagram of a network node in accordance with one example embodiment.

FIG. 2 shows a block diagram of a network node 200 in accordance with one example embodiment. The network node 200 is intended to communicate with a UE and/or one or more other network nodes in any of the above-described communication networks. As shown in FIG. 2, the network node 200 comprises a processor 202 and a memory 204. The memory 204 stores processor-executable instructions 206 which, when executed by the processor 202, cause the processor 202 to perform the aspects of the present disclosure, as will be described below in more detail. It should be noted that the number, arrangement, and interconnection of the constructive elements constituting the network node 200, which are shown in FIG. 2, are not intended to be any limitation of the present disclosure, but merely used to provide a general idea of how the constructive elements may be implemented within the network node 200. For example, the processor 202 may be replaced with several processors, as well as the memory 204 may be replaced with several removable and/or fixed storage devices, depending on particular applications. Furthermore, it is assumed that the processor 202 is capable of performing different operations required to perform data reception and transmission, such, for example, as signal modulation/demodulation, encoding/decoding, etc. In another embodiment, the network node 200 may further comprise an individual transceiving unit comprising an antenna array and controlled by the processor 202.

The processor 202 may be implemented as a CPU, general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 202 may be implemented as any combination of one or more of the aforesaid. As an example, the processor 202 may be a combination of two or more microprocessors.

The memory 204 may be implemented as a classical nonvolatile or volatile memory used in the modern electronic computing machines. As an example, the nonvolatile memory may include Read-Only Memory (ROM), ferroelectric Random-Access Memory (RAM), Programmable ROM (PROM), Electrically Erasable PROM (EEPROM), solid state drive (SSD), flash memory, magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

The processor-executable instructions 206 stored in the memory 204 may be configured as a computer-executable program code which causes the processor 202 to perform the aspects of the present disclosure. The computer-executable program code for carrying out operations or steps for the aspects of the present disclosure may be written in any combination of one or more programming languages, such as Java, C++, or the like. In some examples, the computer-executable program code may be in the form of a high-level language or in a pre-compiled form and be generated by an interpreter (also pre-stored in the memory 204) on the fly.

Figure 3:
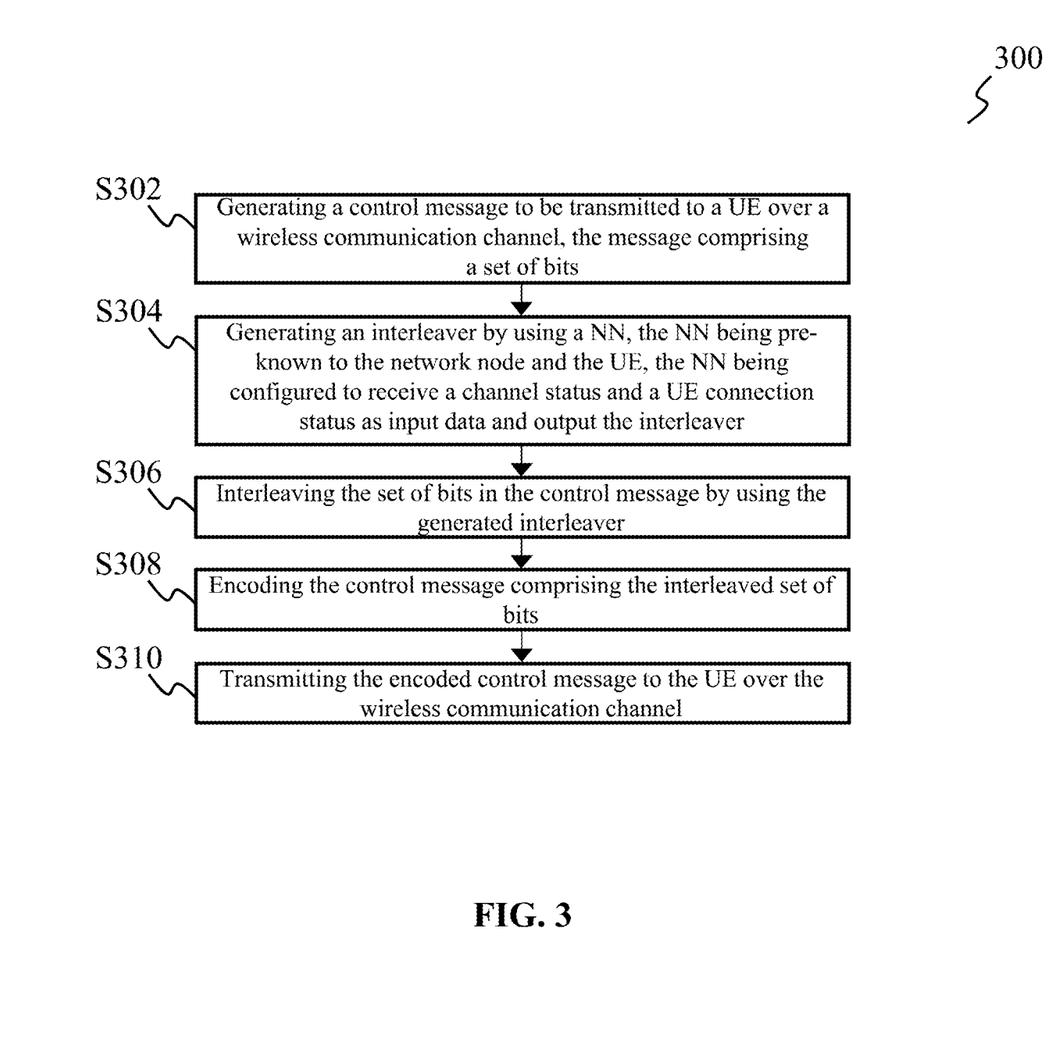
FIG. 3 shows a flowchart of a method for operating the network node of FIG. 2 in accordance with one example embodiment.

FIG. 3 shows a flowchart of a method 300 for operating the network node 200 in accordance with one example embodiment.

The method 300 starts with a step S302, in which the processor 202 generates a control message to be transmitted to a UE over a wireless communication channel. The control message comprises a set of bits and may be, for example, a control message that causes the UE to take a certain action (e.g., the control message may be a RRC Release message that instructs the UE to go from RRC_CONNECTED state to RRC_INACTIVE state, or if the UE has a sparse traffic, the control message may indicate that the resulting control bits for frequency-domain scheduling may also become sparse). The wireless communication channel has a channel status that is previously reported by the UE to the network node 200, e.g., in the form of Channel State Information (CSI), such as a Rank indicator (RI), a Precoder Matrix Indicator (PMI), a Channel Quality indicator (CQI), a CSI-RS resource indicator (CRI), etc. The UE itself has a connection status in the wireless communication channel, which may be defined by the RRC protocol, so that there may be three connection statuses in 5G NR networks: RRC_CONNECTED, RRC_INACTIVE, and RRC_IDLE.

Next, the method 300 goes on to a step S304, in which the processor 202 generates an interleaver by using a NN. It should be again noted that the NN is pre-known to both the network node 200 and the UE (i.e., it is shared by the UE and the network node 200). For example, the NN may be pre-stored in the UE and the network node 200 (i.e., in the memory 204), or it may be provided to the UE and the network node 200 from a remote server before or during the method 300. The NN is configured to receive the channel status of the wireless communication channel and the connection status of the UE as input data and output the interleaver. In general, the NN model may be configured to receive any local information (e.g., reported CQI, past DCI messages, UE RRC status, etc.) that is common to both the UE and the network node 200. Preferably, the NN is pre-trained by using an end-to-end learning model with a back-propagation algorithm and a cross-entropy loss function. More preferably, the NN is configured as a Gumbel-Sinkhorn network.

After the interleaver is generated, the method 300 goes on to a step S306, in which the processor 202 interleaves the set of bits in the control message by using the generated interleaver.

In a step S308, the processor 202 encodes the control message comprising the interleaved set of bits. Said encoding may be performed, for example, by using a polar code. It should be noted that the present disclosure is not limited to polar codes only—in some embodiments, any channel code (e.g., convolutional codes) may be applicable, which is suitable for a control channel.

The method 300 ends up with a step S310, in which the processor 202 transmits the encoded control message to the UE over the wireless communication channel.

Figure 4:
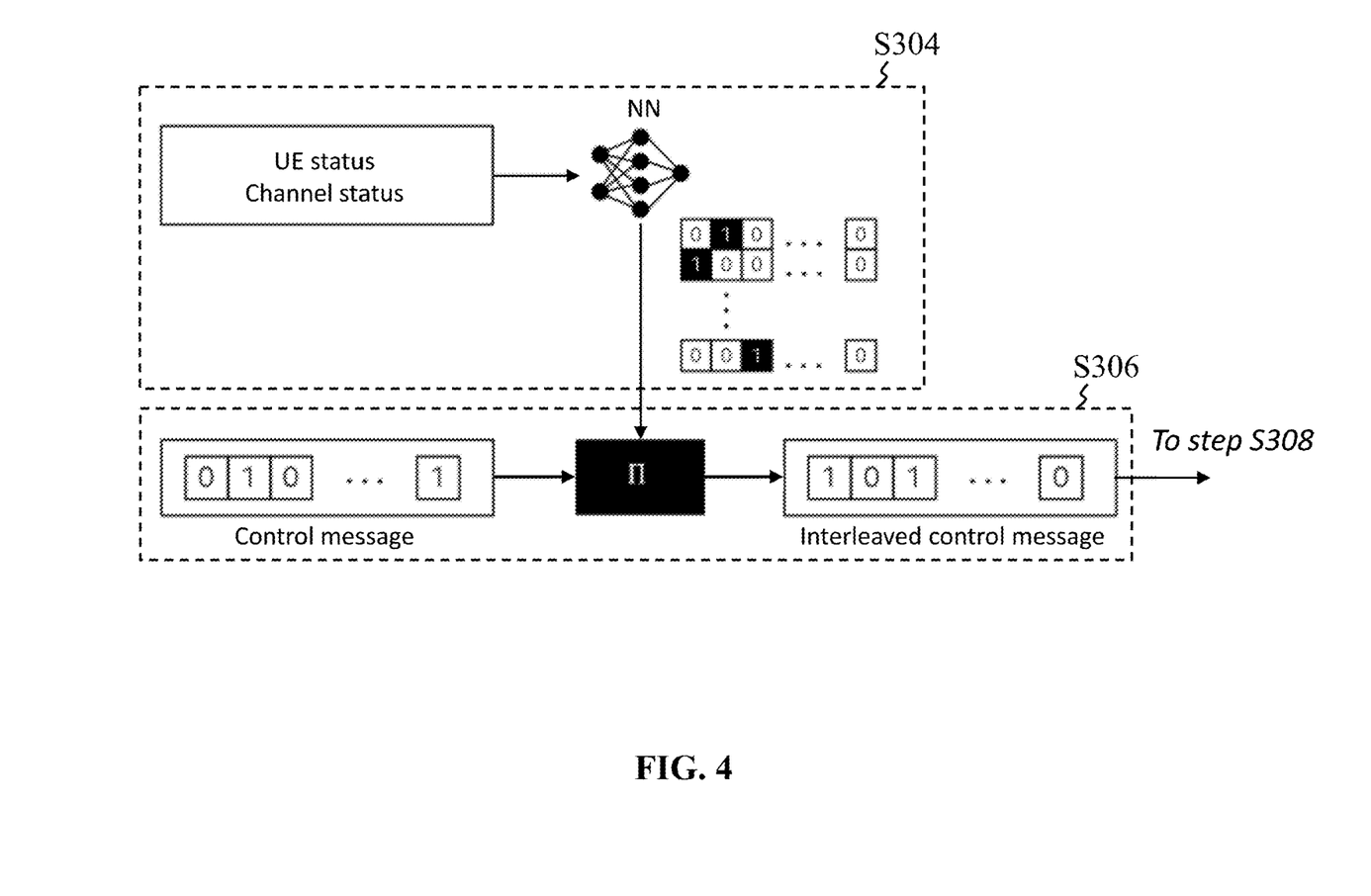
FIG. 4 schematically explains the steps of generating an interleaver by using a NN and interleaving a control message by using the generated interleaver, which are used in the method of FIG. 3.

FIG. 4 schematically explains the steps S304 and S306 of the method 300. As can be seen, the connection status of the UE and the channel status are fed to the NN which, in response, outputs the interleaver matrix with 1's and 0's. It should be noted that the present disclosure is not limited to this type of binary matrices. The interleaver matrix is then applied to a (binary) control message to obtain an interleaved control message.

Figure 5:
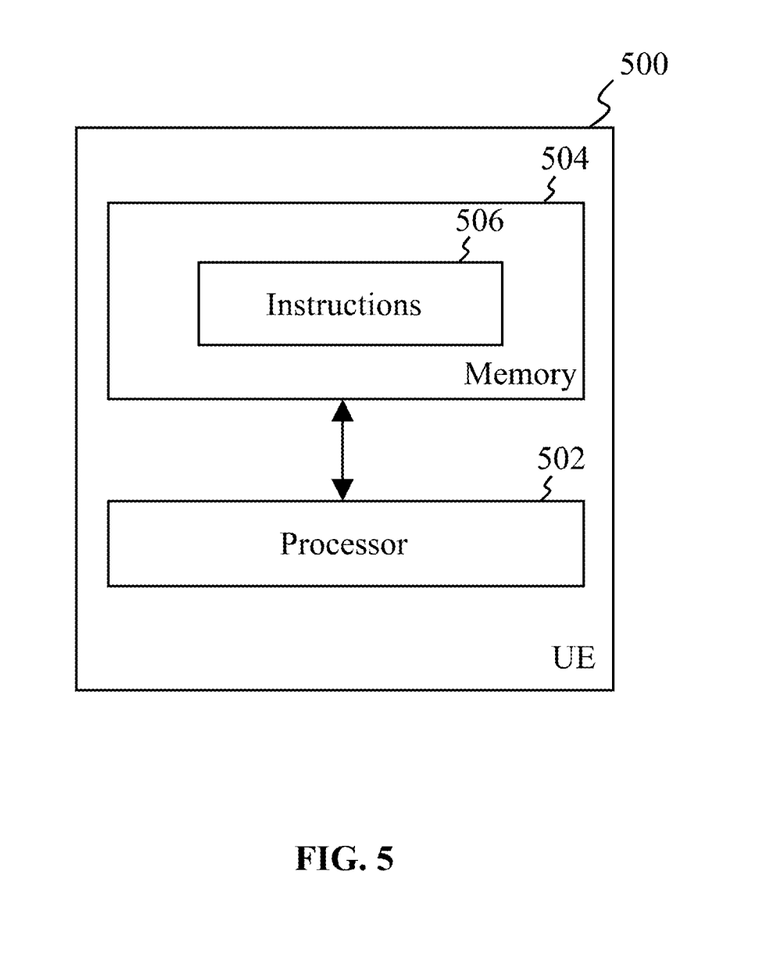
FIG. 5 shows a block diagram of a UE in accordance with one example embodiment.

FIG. 5 shows a block diagram of a UE 500 in accordance with one example embodiment. The UE 500 is intended to communicate with the network node 200 in any of the above-described communication networks. As shown in FIG. 5, the UE 500 comprises a processor 502 and a memory 504. The memory 504 stores processor-executable instructions 506 which, when executed by the processor 502, cause the processor 502 to implement the aspects of the present disclosure, as will be described below in more detail. It should be again noted that the number, arrangement, and interconnection of the constructive elements constituting the UE 500, which are shown in FIG. 5, are not intended to be any limitation of the present disclosure, but merely used to provide a general idea of how the constructive elements may be implemented within the UE 500. In general, the processor 502, the memory 504, and the processor-executable instructions 506 may be implemented in the same or similar manner as the processor 202, the memory 204, and the processor-executable instructions 206, respectively.

Figure 6:
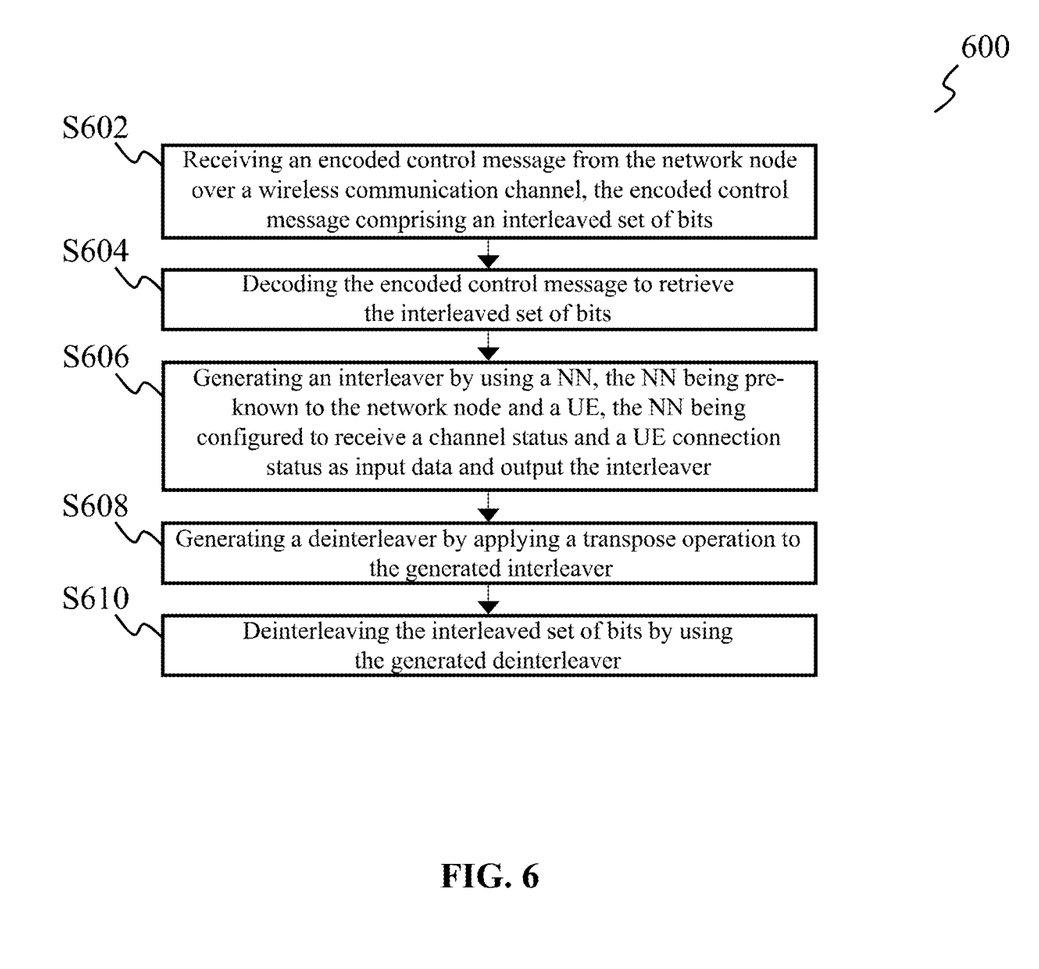
FIG. 6 shows a flowchart of a method for operating the UE of FIG. 5 in accordance with one example embodiment.

FIG. 6 shows a flowchart of a method 600 for operating the UE 500 in accordance with one example embodiment. The method 600 starts with a step S602, in which the processor 502 receives the encoded control message from the network node 200 (i.e., the processor 202) over the wireless communication channel. The encoded control message comprises the interleaved set of bits obtained by applying the NN-generated interleaver to the initial set of bits. Further, the method 600 proceeds to a step S604, in which the processor 502 decodes the encoded control message to retrieve the interleaved set of bits. After that, the method 600 goes on to a step S606, in which the processor 502 generates the interleaver by using the same NN as the one used by the processor 202. Thus, the step S606 of the method 600 is identical to the step S304 of the method 300. In a step S608, the processor 502 generates a deinterleaver by applying a transpose operation to the generated interleaver. The method 600 ends up with a step S610, in which the processor 502 deinterleaves the interleaved set of bits by using the generated deinterleaver.

Figure 7:
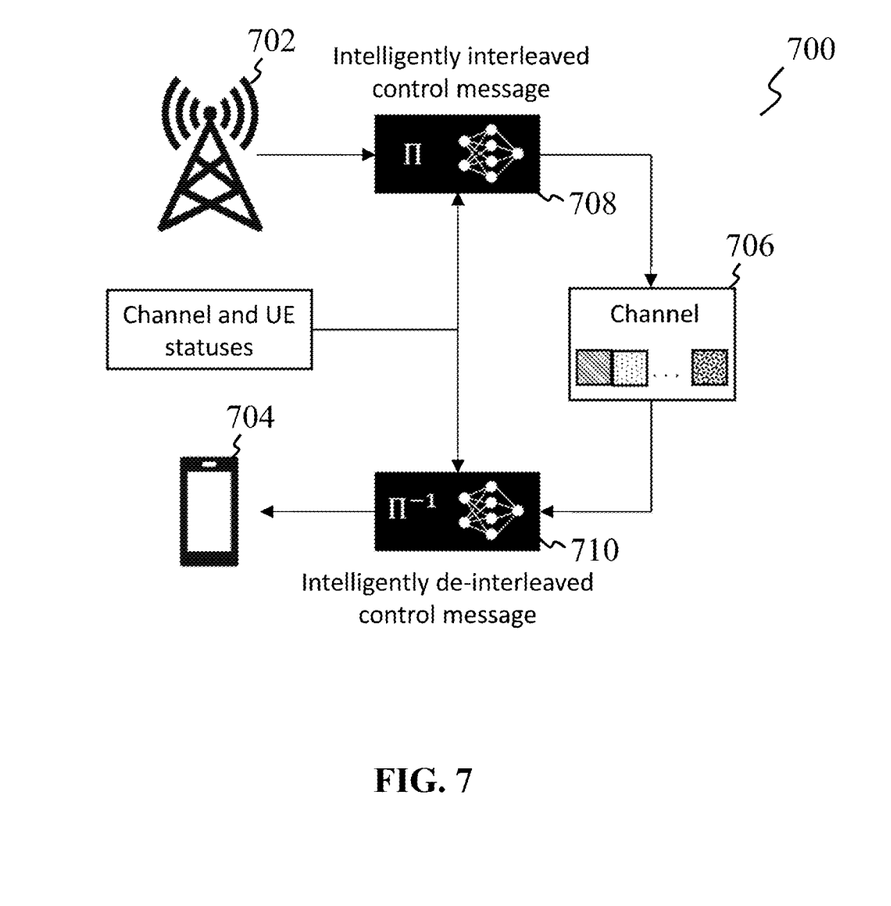
FIG. 7 shows a block diagram of a wireless communication system in accordance with one example embodiment.

FIG. 7 shows a block diagram of a wireless communication system 700 in accordance with one example embodiment. The system 700 comprises a network node 702, a UE 704 (i.e., smartphone), and a wireless communication channel 706 established between the network node 702 and the UE 704. The network node 702 is assumed to be configured as the network node 200, while the UE 704 is assumed to be configured as the UE 500. Thus, the network node 702 may generate and send an intelligently interleaved control message 708 to the UE 704 over the channel 706 in accordance with the method 300. In turn, the UE 704 may receive and obtain an intelligently de-interleaved control message 710 in accordance with the method 500. FIG. 7 again highlights that the NN configured to generate the interleaver is shared by the network node 702 and the UE 704.

Figure 8:
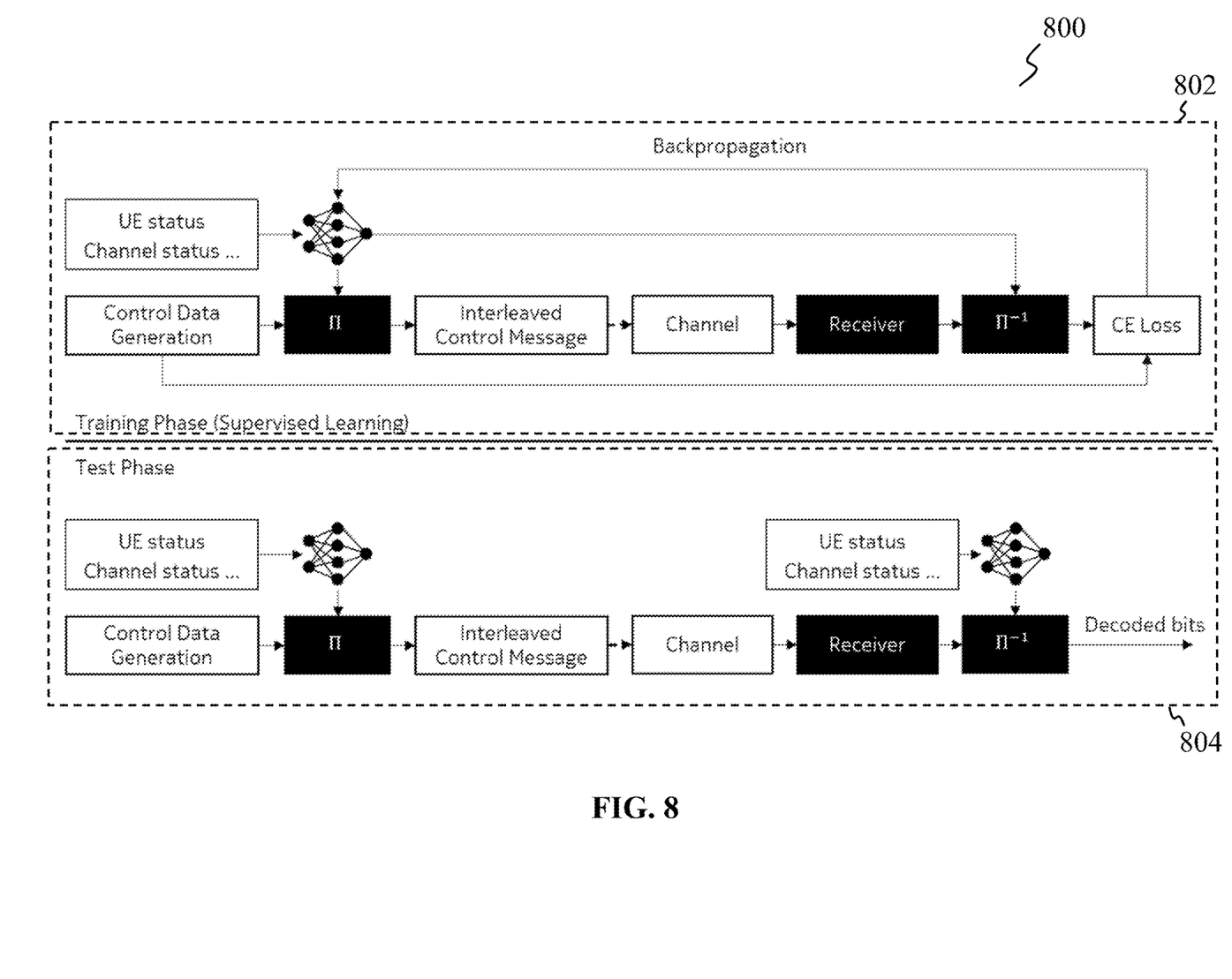
FIG. 8 schematically shows an end-to-end learning model applied to the NN used in the methods of FIGS. 3 and 6 in accordance with a first example embodiment.

FIG. 8 schematically shows an end-to-end learning model 800 applied to the NN used in the methods 300 and 600 in accordance with a first example embodiment. The model 800 comprises two phases: a training phase 802 and a test phase 804.

In the training phase 802, a central training server collects information that is known both to the network node 200 and the UE 500. For instance, this information may comprise sub-band CQIs and the connection status of the UE 500. This common information serves as the input to the NN to generate the interleaver. By embedding the NN as part of the end-to-end training model 800, the CE loss at the receiver side is minimized. The receiver is highlighted in FIG. 8 to indicate that it may be implemented as any deep learning-based receiver in the model 800. There are two options in which the central training server may manage the training of the NN to generate the interleaver:

1) The central training server collects decoded results from the receiver (i.e., the UE 500 itself). Since the processors at the receiver side such as an equalizer and a decoder could be known, the UE 500 can report the decoded results to the central training server. Then, the central training server generates gradients from back-propagation and update trainable parameters.

2) The central training server builds up a simulator-based receiver. In this case, the central training server creates a large database of possible combinations of channel and control bits. By feeding the NN with all possible conditions, the NN will learn to generate the interleaver. This option does not introduce any delay from the UE side, but the training performance will rely on the closeness between the simulation and real data observed at the receiver side.

In the test phase 804, the well-trained NN is provided to the network node 200 and the UE 500. The deinterleaver equipped at the UE side is simply the transpose of the NN output. Note that since the UE 500 shares the same common information as the network node 200, the generated interleaver should be identical for the network node 200 and the UE 500. As a result, the UE 500 can successfully decode the source control message.

Figure 9:
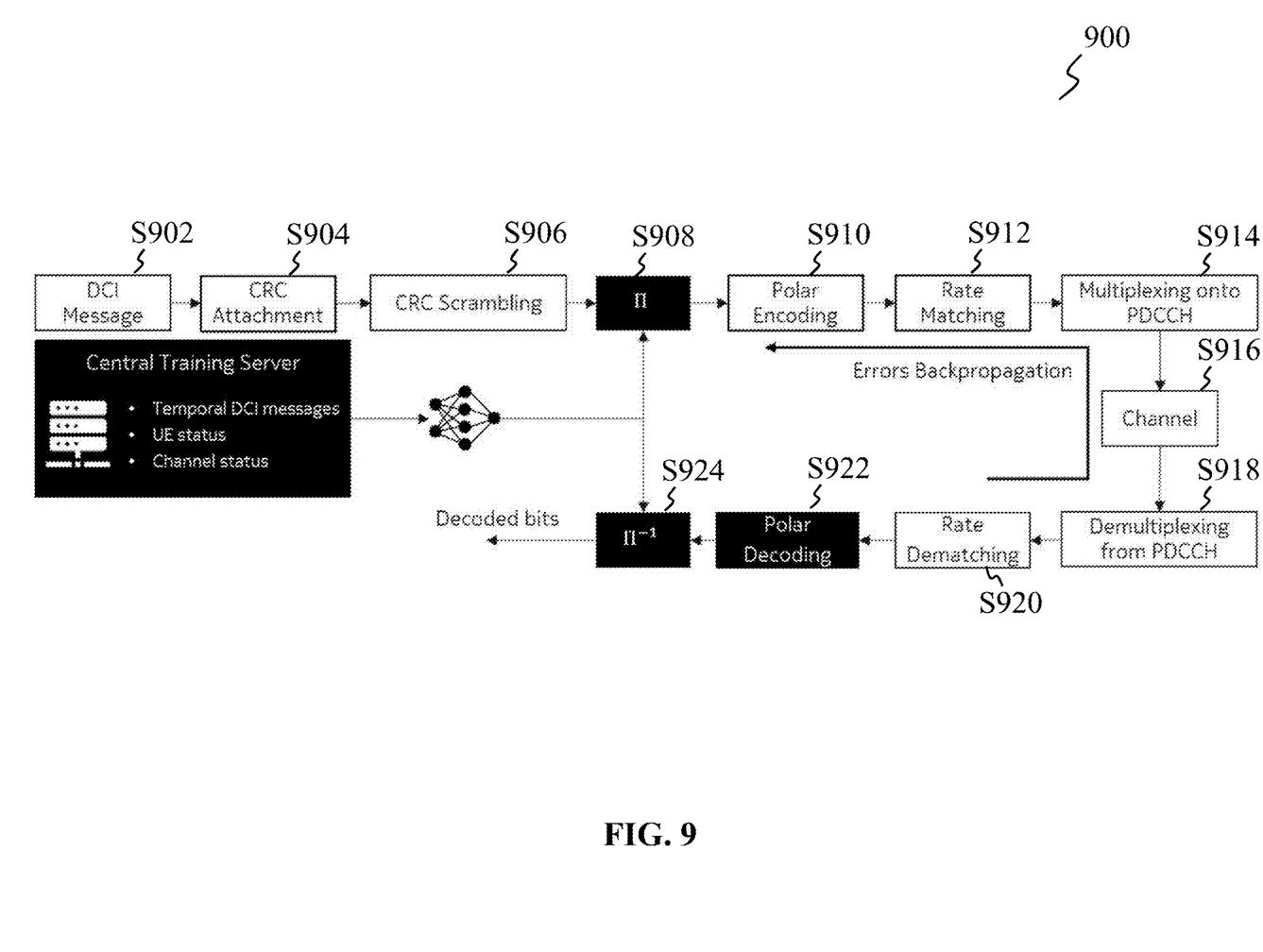
FIG. 9 schematically shows an end-to-end learning model applied to the NN used in the methods of FIGS. 3 and 6 in accordance with a second example embodiment.

FIG. 9 schematically shows an end-to-end learning model 900 applied to the NN used in the methods 300 and 600 in accordance with a second example embodiment. The polar encoding and decoding procedures for a Physical Downlink Control Channel (PDCCH) are implied in this case. As shown in FIG. 9, once a control (e.g., DCI) message is generated in a step S902, the following steps are performed before transmitting it through the PDCCH:

S904: A CRC sequence for error-detection is generated according to the DCI message.

S906: The CRC parity bits are scrambled with a corresponding Radio Network Temporary Identifier (RNTI) before channel encoding.

S908: The interleaver matrix is generated by the NN. As noted earlier, the input of the NN is represented by the information that is known to both the network node 200 and the UE 500. For instance, sub-band CQIs and all the previous DCI messages may be used as such information. It should be noted that the present disclosure does not propose to learn a fixed interleaver, but to learn a NN function that generates the interleaver according to the channel and UE statuses. In this sense, the NN-generated interleaver is adaptive. The interleaver matrix is applied to the DCI message to interleave the sequence of bits therein.

S910: According to the standards in 5G NR networks, a polar code is used as a channel code for the PDCCH.

S912: Depending on system requirements, rate matching provides the exact number of bits to be transmitted.

S914: The rate matched bits are multiplexed onto the PDCCH. Since the DCI message requires a high reliability, a QPSK modulation is performed.

In a step S916, the DCI message is transmitted over the PDCCH to the UE 500.

Next, symmetric steps are performed by the UE 500 with respect to the DCI message. That is, the UE 500 demultiplexes the DCI message from the PDCCH in a step 918, perform rate dematching in a step S920, perform polar decoding in a step S922, and de-interleave the interleaved sequence of bits in the decoded DCI message in a step S924. It should be noted that the polar decoding is highlighted in FIG. 9 to indicate that the joint design of the interleaver and the polar decoder is possible to further improve the polar decoding performance.

Let us now mathematically describe the operation of the end-to-end learning model 900 in case of using the Gumbel-Sinkhorn network. For convenience, let us first introduce the following notations:

- $x^t \in \mathbb{F}_2^A$: the CRC scrambled sequence with a length of A at TTI t.
- $q^t \in \mathbb{R}^V$: the latest sub-band CQIs that are reported from the UE 500 at TTI t.
- $c^t$: the RRC states for each UE at TTI t.
- $f_{NN}(\cdot)$: NN function that finds the latent permutation matrix.
- $S^k(P) = \Theta_c(\Theta_r(S^{k-1}(P)))$, a Sinkhorn operator with a preset number of iterations of K. $\Theta_r = P \oslash P1_A$, $\Theta_c = P \oslash 1_A^T P$, $1_A$ indicates an all-ones column vector and $\oslash$ denotes the element-wise division. In short, the Sinkhorn operator iteratively performs row-wise and column-wise normalization to an input matrix P.
- $\Pi \in \mathbb{F}_2^{K \times K}$: a permutation matrix that has a size of K×K.

The steps for training the NN and encoding the DCI messages may be summarized as follows:

1. Update a memory buffer for the features, such as sub-band CQIs, DCI messages and UE's RRC states. The memorized features are denoted as $m^t = \{x^t, x^{t-1}, \ldots x^{t-M}, q^t, q^{t-1}, q^{t-M}, c^t, c^{t-1}, \ldots, c^{t-M}\}$, where M is the memory buffer size. The memory buffer size is a preset value, which may be determined based on the channel coherence time and the computational complexity that the receiver may support.
2. Pass the features $m^t$ into the NN to find the latent variables, $v^t = f_{NN}(m^t)$.
3. Given the latent variables $v^t$, sample a permutation matrix from the Gumbel-Sinkhorn distribution. The steps for sampling a permutation matrix are as follows:
   a. Sample a Gumbel noise: $\epsilon \sim$ Gumbel.
   b. Apply the Sinkhorn operator to $v^t$, i.e., $$\Pi = S^k\left(\frac{v^t + \epsilon}{\tau}\right)$$

to obtain a differentiable continuous permutation matrix. τ is a scaling factor to adjust the continuity of the sampled permutation matrix.
4. (Additional step if the DCI payload length is smaller than the permutation matrix, i.e., A<K) Add zero-paddings to the DCI payload $x^t \leftarrow [x^t, 0]$.
5. Permutate the CRC scrambled message by $\hat{x}^t = \Pi x^t$.
6. (Additional step if the DCI payload length is smaller than the permutation matrix, i.e., A<K) Remove the zero-paddings while remaining the order of payload bits in $\hat{x}^t$.
7. Encode the permutated message by a polar code. Note that a step-function might be required if multiplexing requires binary data. Since the step-function is not differentiable, in the forward pass, the step-function may be applied and during the backpropagation, a soft function can be used to provide gradients. For example:

$$a. \begin{cases} f_{forward}(x) = \begin{cases} 0, x < 0 \\ 1, x \geq 0 \end{cases} \\ \frac{\sigma f_{forward}(x)}{\sigma x} = \frac{1}{1+e^{-x}} \frac{1}{1+e^{x-1}} \end{cases}$$

8. Multiplex the encoded message onto the PDCCH and transmit the signals through a wireless channel.

At the receiver side, after demultiplexing and channel decoder, the transpose of the interleaver is applied to the decoded sequence. The receiver should obtain a recovered sequence $\hat{x}^t$ with soft information. The CE loss $f_{CE}(x^t, \hat{x}^t) = \Sigma_i (x_i^t \log \hat{x}_i^t + (1-x_i^t) \log(1-\hat{x}_i^t))$ is computed between $\hat{x}^t$ and $x^t$ and the gradient of loss is back-propagted to the NN to update its trainable parameters.

Figure 10:
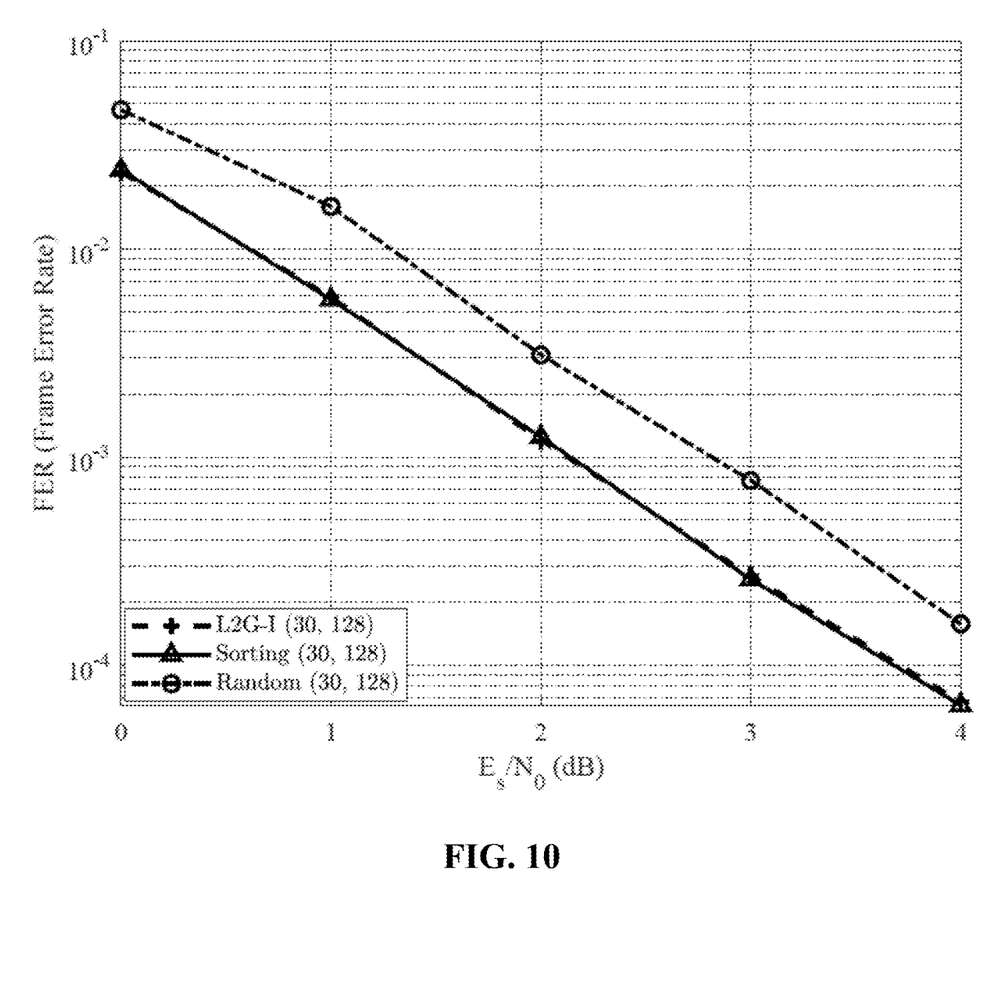
FIG. 10 shows a FER versus a SNR for three different interleaving strategies, namely: said "random interleaver", said "sorting interleaver", and the NN-generated interleaver according to the present disclosure.

FIG. 10 shows a FER versus a SNR for three different interleaving strategies, namely: said "Random-interleaver", said "Sorting interleaver", and the NN-generated interleaver according to the present disclosure. The NN-generated interleaver is conditionally called "L2G-I" in FIG. 10, which stands for "Learn-to-generate interleaver". In each of the three interleaving strategies, it is assumed that information bits are interleaved, polar-encoded, QPSK-modulated and transmitted through a flat fading channel. The length of the information bits is assumed to be 30 and the encoded message has a length of 128. At the receiver side, Linear Minimum Mean Square Error (LMMSE) equalization and Belief Propagation (BP) polar decoding are implemented. The NN in this example simply has 2 hidden layers with 512 and 256 neurons, respectively. A non-linear activation function for the hidden layers is chosen to be Rectified Linear Unit. The output layer of the NN has a size of $k^2=900$. One can see that the NN-generated interleaver (i.e., "L2G-I") can quickly converge to a steady performance and as shown in FIG. 10, it achieves the same performance as said "Sorting interleaver", which outperforms said "Random-interleaver" 0.6 dB at a FER=$10^{-3}$.

It should be noted that each step or operation of the methods 300 and 600 and the learning models 800 and 900, or any combinations of the steps or operations, can be implemented by various means, such as hardware, firmware, and/or software. As an example, one or more of the steps or operations described above can be embodied by processor executable instructions, data structures, program modules, and other suitable data representations. Furthermore, the processor-executable instructions which embody the steps or operations described above can be stored on a corresponding data carrier and executed by the processors 202 and 502, respectively. This data carrier can be implemented as any computer-readable storage medium configured to be readable by said at least one processor to execute the processor executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the example embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A network node in a wireless communication network, comprising:
   at least one processor; and
   at least one memory storing instructions that, when executed by the at least one processor, cause the network node at least to:
   generate a control message to be transmitted to a User Equipment (UE) over a wireless communication channel, the control message comprising a set of bits, the wireless communication channel having a channel status, and the UE having a connection status in the wireless communication network;
   generate an interleaver by using a Neural Network (NN), the NN being pre-known to both the network node and the UE, the NN being configured to receive the connection status of the UE and the channel status of the wireless communication channel as input data and output the interleaver, the interleaver being an orthogonal binary matrix;
   interleave the set of bits in the control message by using the generated interleaver;
   encode the control message comprising the interleaved set of bits; and
   transmit the encoded control message to the UE over the wireless communication channel.

2. The network node of claim 1, wherein the network node is configured to encode the message based on a polar code or a convolutional code.

3. The network node of claim 1, wherein the connection status of the UE is defined by a Radio Resource Control (RRC) protocol, and wherein the channel status of the wireless communication channel comprises Channel State Information (CSI) previously reported by the UE to the network node.

4. The network node of claim 1, wherein the NN is pre-trained by using an end-to-end learning model with a back-propagation algorithm and a cross-entropy loss function.

5. The network node of claim 1, wherein the NN is configured as a Gumbel-Sinkhorn network.

6. A User Equipment (UE) in a wireless communication network, comprising:
   at least one processor; and
   at least one memory storing instructions that, when executed by the at least one processor, cause the UE at least to:
   receive an encoded control message from a network node over a wireless communication channel, the encoded control message comprising an interleaved set of bits, the wireless communication channel having a channel status;
   decode the encoded control message to retrieve the interleaved set of bits;
   generate an interleaver by using a Neural Network (NN), the NN being pre-known to both the UE and the network node, the NN being configured to receive the channel status of the wireless communication channel and a connection status of the UE in the wireless communication network as input data and output the interleaver, the interleaver being an orthogonal binary matrix;
   generate a deinterleaver by applying a transpose operation to the generated interleaver; and
   deinterleave the interleaved set of bits by using the generated deinterleaver.

7. The UE of claim 6, wherein the encoded control message is obtained based on a polar code or a convolutional code, and wherein the UE is configured to decode the encoded control message based on the polar code or the convolutional code, respectively.

8. The UE of claim 6, wherein the connection status of the UE is defined by a Radio Resource Control (RRC) protocol, and wherein the channel status of the wireless communication channel comprises Channel State Information (CSI) previously reported from the UE to the network node.

9. The UE of claim 6, wherein the NN is pre-trained by using an end-to-end learning model with a back-propagation algorithm and a cross-entropy loss function.

10. The UE of claim 6, wherein the NN is configured as a Gumbel-Sinkhorn network.

11. A method for operating a network node in a wireless communication network, comprising:
    generating a control message to be transmitted to a User Equipment (UE) over a wireless communication channel, the control message comprising a set of bits, the wireless communication channel having a channel status, and the UE having a connection status in the wireless communication network;
    generating an interleaver by using a Neural Network (NN), the NN being pre-known to both the network node and the UE, the NN being configured to receive the channel status of the wireless communication channel and the connection status of the UE as input data and output the interleaver, the interleaver being an orthogonal binary matrix;
    interleaving the set of bits in the control message by using the generated interleaver;
    encoding the control message comprising the interleaved set of bits; and
    transmitting the encoded control message to the UE over the wireless communication channel.

12. A computer program product comprising a non-transitory computer-readable storage medium, wherein the computer-readable storage medium stores a computer code which, when executed by at least one processor, causes the at least one processor to perform the method according to claim 11.

* * * * *